P. K. ALDRICH.
ROLLER BOLSTER BEARING.
APPLICATION FILED JULY 1, 1916. RENEWED NOV. 14, 1917.
1,270,090.
Patented June 18, 1918.
2 SHEETS—SHEET 1.
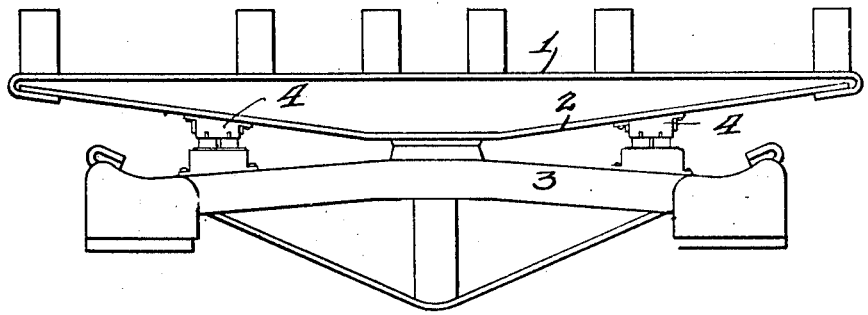
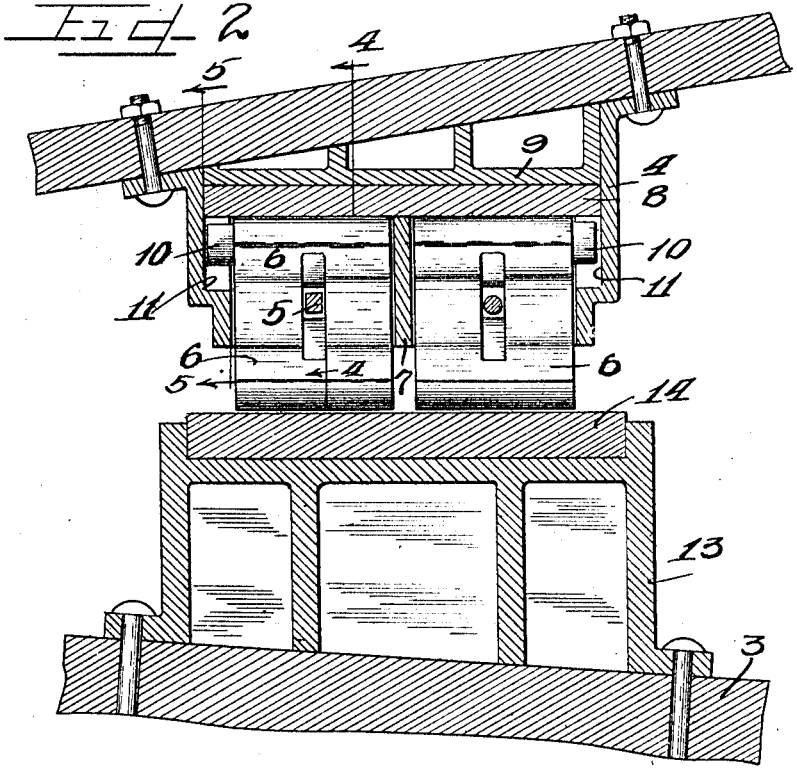

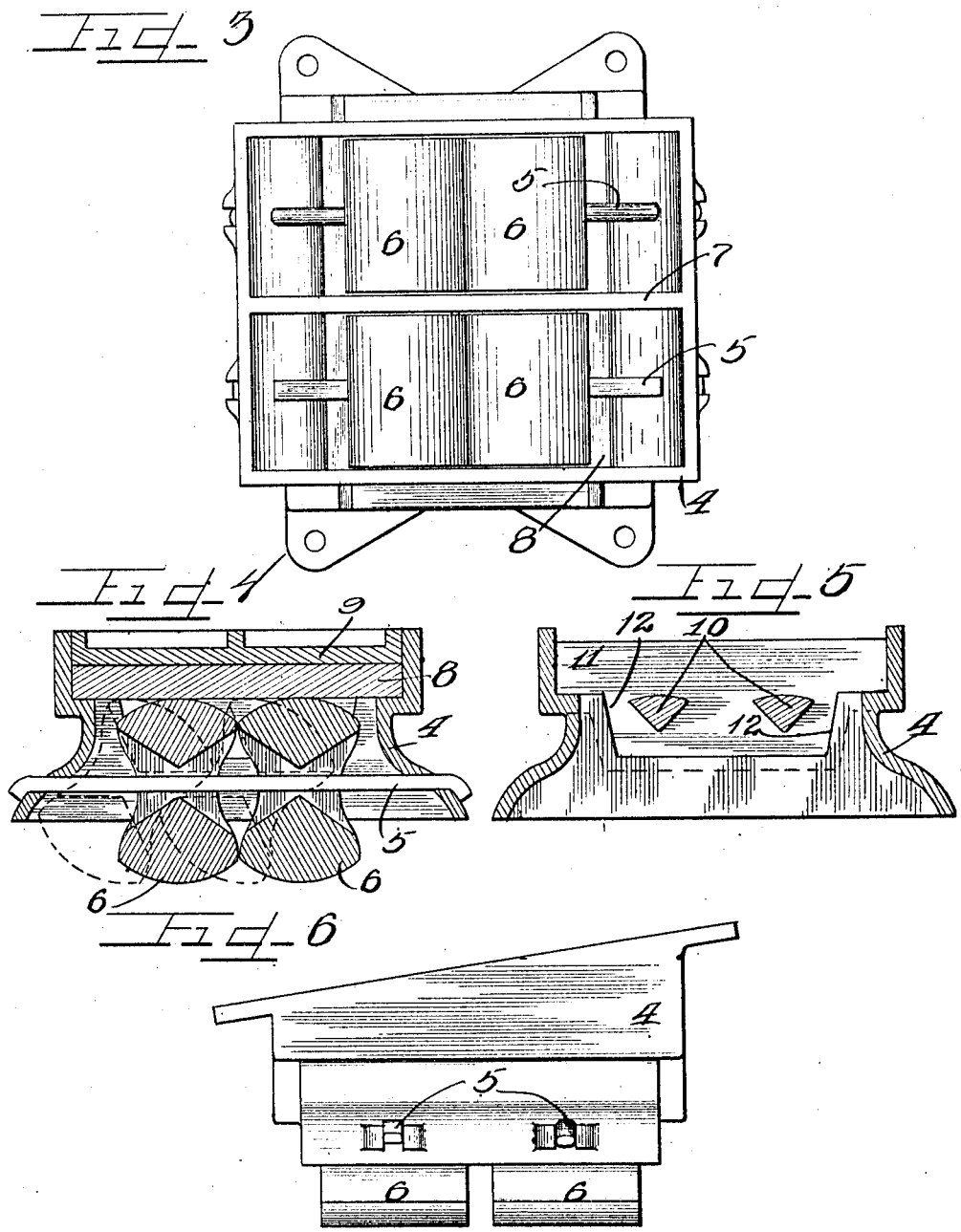

UNITED STATES PATENT OFFICE.

PAUL K. ALDRICH, OF CHICAGO, ILLINOIS, ASSIGNOR, BY MESNE ASSIGNMENTS, TO ALLEN McKENZIE, OF CHICAGO, ILLINOIS.

ROLLER BOLSTER-BEARING.

1,270,090.

Specification of Letters Patent.

Patented June 18, 1918.

Application filed July 1, 1916, Serial No. 107,069. Renewed November 14, 1917. Serial No. 202,072.

*To all whom it may concern:*

Be it known that I, PAUL K. ALDRICH, a citizen of the United States, and a resident of the city of Chicago, in the county of Cook and State of Illinois, have invented certain new and useful Improvements in Roller Bolster-Bearings; and I do hereby declare that the following is a full, clear, and exact description of the same, reference being had to the accompanying drawings, and to the numerals of reference marked thereon, which form a part of this specification.

This invention relates to an improved type of bolster bearing adapted to be mounted in place between the body and truck bolsters of a car to permit relative movement therebetween and yet act effectively to support the body bolster upon the truck bolster, in all positions of adjustment thereof, and with means readily removable to retain the roller elements of the structure in position.

It is an object therefore of this invention to construct a roller bearing for use between the body and truck bolsters of a car which operates to pivotally support the body bolster upon the truck bolster and with removable wear plates against which said rollers contact and roll as relative movements take place between said bolsters.

It is also an object of this invention to construct a bolster roller bearing comprising roller members confined within a casing and bearing upon wear plates and with a retaining means for said rollers extending longitudinally therethrough in the direction of rolling movement of said rollers to retain the same within the casing therefor, and with abutments formed on the ends of the rollers to limit the extent of movement thereof by contact with the casing.

It is also an object of this invention to construct a bolster side roller bearing comprising means adapted to be secured to the respective body and truck bolsters of a car with roller elements interposed therebetween and retained in engagement with the body bolster by means extending through longitudinally disposed cored out recesses in said rollers.

It is furthermore an object of this invention to construct a side roller bolster bearing comprising a casing member for attachment to the body bolster with means releasably secured therethrough to retain roller elements engaged therein and with wear plates for said rollers, one carried by means secured upon the truck bolster and the other carried by said casing against which said rollers bear in all positions of movement.

It is finally an object of this invention to construct an improved type of bolster side bearing consisting of few parts, simple in operation and construction, and acting efficiently to perform the purpose.

The invention (in a preferred form) is illustrated in the drawings and hereinafter more fully described.

In the drawings:

Figure 1 is a conventional front elevation of a body and truck bolster illustrating roller bearings embodying the principles of my invention mounted therebetween.

Fig. 2 is a transverse vertical section taken through one of the bearings with the roller elements shown in elevation.

Fig. 3 is a bottom plan view of one of the associated roller and casing elements attachable on one side of the body bolster.

Fig. 4 is a fragmentary detail section taken on line 4—4 of Fig. 2, with parts omitted and parts shown in elevation.

Fig. 5 is a similar section taken on line 5—5 of Fig. 2 with parts omitted.

Fig. 6 is an exterior front elevational view of the mechanisms shown in Fig. 4.

As shown in the drawings:

The reference numeral 1, indicates the top plate of a conventional type of body bolster and the reference number 2, the bottom plate thereof. A truck bolster on which the body bolster 1—2, is centrally pivoted and supported in a conventional manner is denoted as a whole by the reference numeral 3. Bolted to the bottom plate 2, of the body bolster, on each side thereof are frame castings or casings, each one denoted as a whole by the reference numeral 4, one side wall of each of which is of less depth than the other owing to the inclination of the bottom plate 2, of the body bolster on which the casing is attached. The end walls of the frame casing 4, are provided with apertures therethrough, and engaged longitudinally therethrough are retaining rods or bars 4, one circular and one rectangular to show that either can be used, which engage through longitudinally cored out portions of roller elements 6, there being four within each frame casing 4, in pairs of two, that is, with one retaining bar 5, extending longitudinally through the cored out portions of two alined roller elements. The interior of each of the frame castings 4, is divided into two compartments by a longitudinally extending wall or partition 7, and as clearly shown in Fig. 2, a pair of the roller elements 6, in longitudinal alinement with one another are disposed on each side thereof.

Inserted into the frame casing 4, above the roller elements 6, and resting at its ends upon the shoulders formed within the casing, is a heavy wear plate 8, and inserted between the wear plate 8, and the under surface of the bolster bottom plate 2 is a webbed trapezoidal casting or filler member 9. As clearly shown in Figs. 2 and 5, each of said rollers 6, has formed on the outer side surfaces thereof, a triangular shaped stop or abutment member 10, and these are disposed to move in a longitudinal compartment 11, formed horizontally on each side of the casing 4, the end walls 12, of said compartments angled to receive the abutments to limit the movement of the roller elements 6, in the casing. Bolted to the truck bolster 3, on each side thereof is a frame casting 13, each having disposed in the recessed upper surface thereof a wear plate 14, upon which the respective roller elements 6, bear. The lower portion or under surface of each of said frame castings 13, is inclined to conform to the inclination of the top surface of the truck bolster 3, so that the wear plates 14, are substantially horizontal.

The operation is as follows:—

The frame casing 4, is bolted to the body bolster 1—2, with the wear plate 8 and filler member 9, therein, and the roller elements releasably held engaged in the frame casting by the longitudinal bars or rods 5. Likewise the frame casting 10, is bolted to the upper surface of the truck bolster 3, with its wear plate 14, substantially parallel to the wear plate 8, and adapted to receive the roller elements 6, resting thereon. Due to the fact that the cored out recesses or slots of the roller elements 6, extend longitudinally therethrough, the retaining rods or bars form no hindrance to the longitudinal rolling movement thereof, and furthermore the shape of said roller elements is such that the same do not interfere with one another. The limit of rolling movement of the roller elements 6, is governed by the interlocking of the respective elements and it will be obvious from the construction described that the stops or abutments 10 do not carry any of the weight of the rollers when said rollers are in normal operation or neutral position.

I am aware that various details of construction may be varied through a wide range without departing from the principles of this invention, and I therefore do not purpose limiting the patent granted otherwise than necessitated by the prior art.

I claim as my invention:

1. A bolster roller bearing comprising a frame casting adapted to be secured to a body bolster, another frame casting adapted to be secured to a truck bolster, wear plates mounted in said respective frame castings, roller elements disposed within said first mentioned frame casting adapted to bear upon the wear plate of said second mentioned frame casting to sustain the weight of the body bolster through said wear plate of said first mentioned frame casting, and longitudinally disposed retaining means extending through cored out recesses in said roller elements to retain the same associated with the body bolster frame casting.

2. In a bolster bearing of the class described, a body bolster frame casting, means extending parallel the line of movement of said elements and centrally therethrough to retain the same connected in said casting, roller elements releasably engaged therewith, a truck bolster frame casting, and wear plates recessed within said respective frame castings against which said roller elements bear in sustaining the weight of the body bolster upon the truck bolster.

3. The combination with a body bolster and truck bolster, of a roller bearing therefor comprising a frame casting secured to the body bolster and a frame casting secured to the truck bolster, wear plates within each of said frame castings, roller elements disposed to receive the thrust between said wear plates and to permit movement therebetween, and longitudinally disposed members extending through longitudinal slots in the roller elements to retain the same engaged with said body bolster frame casting and permit longitudinal rolling movement thereof.

4. A bearing construction of the class described comprising a frame casting having an inclined surface for contact with a body bolster, wear plates mounted in said frame casting, a filler member between the wear plate and surface of the body bolster, roller elements in said frame casting, means extending longitudinally through said roller elements and attached to said frame casting to retain the rollers therein, and a wear plate mounted in said latter frame casting to receive said roller elements bearing thereon.

5. A bolster roller bearing comprising a frame casting adapted to be secured to a body bolster, another frame casting adapted to be secured to a truck bolster, wear plates mounted in said respective frame castings, roller elements disposed within said first mentioned frame casting adapted to bear upon the wear plate of said second mentioned frame casting to sustain the weight of the body bolster through said wear plate of said first mentioned frame casting, abutments formed on the sides of the roller elements to limit the extent of rolling movement thereof, and longitudinally disposed retaining means extending through longitudinal recesses in said roller elements to retain the same associated with the body bolster frame casting.

6. In a bolster bearing of the class described, roller means and mechanism extending longitudinally through said means and parallel the line of movement thereof, to retain the same in operative position.

7. The combination with a body bolster and truck bolster, of a roller bearing therefor comprising a frame casting secured to the body bolster and a frame casting secured to the truck bolster, wear plates inserted in each of said frame castings, pairs of longitudinally alined roller elements disposed to receive the thrust between said wear plates and to permit relative movement therebetween, and unitary means, one extending through each pair of the alined roller elements to retain the same engaged with said body bolster frame casting and permit longitudinal rolling movement thereof.

8. A bearing construction of the class described comprising a frame casting having an inclined surface for contact with a body bolster, chambers formed on each side of said casting, wear plates mounted in said frame casting, a filler member between the wear plate and surface of the body bolster, roller elements releasably retained in said frame casting, abutments on said roller elements adapted to travel in said chambers to limit the movement of said elements, a frame casting attachable upon a truck bolster, and a wear plate mounted in said latter frame casting to receive said roller elements bearing thereon.

9. In a bolster bearing of the class described, a frame casting, roller elements mounted to roll longitudinally therein and means secured through said roller elements parallel the line of movement thereof to retain said elements in operative relation with said casting.

In testimony whereof I have hereunto subscribed my name in the presence of two subscribing witnesses.

PAUL K. ALDRICH.

Witnesses:
CHARLES W. HILLS, Jr.,
EARL M. HARDINE.

Copies of this patent may be obtained for five cents each, by addressing the "Commissioner of Patents, Washington, D. C."